(12) United States Patent
Wang

(10) Patent No.: US 7,717,714 B2
(45) Date of Patent: May 18, 2010

(54) PUZZLE DEVICE FOR TEACHING

(76) Inventor: Chia-Hao Wang, 11F-1, No. 59, Sec. 1, Heping E. Rd., Da-an District, Taipei (TW)

( * ) Notice: Subject to any disclaimer, the term of this patent is extended or adjusted under 35 U.S.C. 154(b) by 609 days.

(21) Appl. No.: 11/655,289

(22) Filed: Jan. 19, 2007

(65) Prior Publication Data
US 2008/0176204 A1    Jul. 24, 2008

(51) Int. Cl.
G09B 3/00    (2006.01)

(52) U.S. Cl. ...................................... 434/327

(58) Field of Classification Search .............. 434/161, 434/170, 174, 176, 322, 327, 333, 342, 347, 434/403–405
See application file for complete search history.

(56) References Cited

U.S. PATENT DOCUMENTS

| | | | |
|---|---|---|---|
| 2,687,579 A * | 8/1954 | Davis | 434/327 |
| 3,107,436 A * | 10/1963 | Edwards | 434/330 |
| 3,136,074 A * | 6/1964 | Hawkins | 434/348 |
| 3,148,457 A * | 9/1964 | Nickl et al. | 434/345 |
| 3,154,863 A * | 11/1964 | La Prelle | 434/345 |
| 3,318,023 A * | 5/1967 | Myers | 434/169 |
| 3,538,622 A * | 11/1970 | Zadig | 434/337 |
| 3,541,699 A * | 11/1970 | Baker, Jr. | 434/337 |
| 3,577,656 A * | 5/1971 | Lyon | 434/324 |
| 3,577,658 A * | 5/1971 | Weinstein et al. | 434/343 |
| 3,626,608 A * | 12/1971 | Ingeneri | 434/362 |
| 3,707,045 A * | 12/1972 | O'Hare | 434/404 |
| 4,018,849 A * | 4/1977 | Chang et al. | 525/520 |
| 4,173,832 A * | 11/1979 | Chen et al. | 434/178 |
| 4,280,809 A * | 7/1981 | Greenberg et al. | 434/343 |
| 5,161,977 A * | 11/1992 | Thomas, Jr. | 434/322 |
| 5,183,399 A * | 2/1993 | Muller | 434/322 |
| 5,797,601 A * | 8/1998 | Ritchie | 273/431 |
| 6,024,578 A * | 2/2000 | Dandl | 434/347 |
| 6,241,527 B1 * | 6/2001 | Rast | 434/327 |

* cited by examiner

Primary Examiner—Kurt Fernstrom
(74) Attorney, Agent, or Firm—Jackson IPG PLLC

(57) ABSTRACT

A puzzle device for teaching comprises a base where a slot is provided on one side for inserting at least one image card, and a plurality of rotatable turning parts are provided thereon. A plurality of indicator units is set on each turning part, and a plurality of groups of quiz and question units are set on recto of each image card. Each quiz unit includes a question-description unit and a sign unit of the same group. Besides, the turning parts are set next to the question units respectively. Thereby, a user can find the question-description unit according to the question unit on the image card, and then can turn the turning part according to the indication of the sign unit to match the indicator unit and the sign unit.

7 Claims, 6 Drawing Sheets

PUZZLE DEVICE FOR TEACHING

BACKGROUND OF THE INVENTION

1. Field of the Invention

The present invention relates to a puzzle device for teaching children, and more particularly, to a puzzle device for teaching, which can provide quizzes of different levels of difficulty for children to answer by using their hands. The purpose of these quizzes is to train a child hands-and-brain reaction by entertaining.

2. Description of the Prior Art

Recently, more and more emphasis is placed on children education, especially on the improvement of the teaching method, which is also the focal subject where educationists intensively delve. Educationists believe that it is much better to adopt active and interesting teaching method rather than uninteresting one to improve the effect for teaching children. Thus, not only should the active teaching method be developed but also the teaching device should be designed for intellectual development and entertainment purpose.

It is necessary to provide quizzes of different levels of difficulty for children to learn effectively. However, it is obviously uninteresting when just giving children quizzes and telling them to write down answers on the answer sheets. They will feel boring after long-term learning of uninteresting method.

In order to improve the above-stated disadvantages to provide a puzzle device for teaching having quizzes of different levels of difficulty for children to answer the quizzes by using their hands while thinking over these quizzes, and also being able to train their hands-and-brain reaction while entertaining, the inventor had the motive to try and develop the present invention after hard research.

SUMMARY OF THE INVENTION

One object of the present invention is to provide a puzzle device for teaching, which has developing entertainment and can strengthen learning effect by providing image cards with image quizzes of different levels of difficulty for children practicing.

Another object of the present invention is to provide a puzzle device for teaching, which provides image cards with image quizzes of different levels of difficulty for children practicing so that children can answer these quizzes by using their hands after thinking over these quizzes and can have their hands-and-brain reaction trained simultaneously.

In order to achieve the above objects, the present invention provides a puzzle device for teaching comprising at least an image card and a base. A plurality of groups of quiz and question units are set on recto of each image card and each quiz unit includes a question-description unit and a sign unit of the same group. A slot is provided on one side of the base for inserting an image card, and a plurality of rotatable turning parts are also provided thereon. A plurality of indicator units is set on each turning part, which corresponds to one question unit.

Thereby, a user can find the question-description unit according to the question unit on the image card, and then can turn the turning part according to the indication of the sign unit to match the indicator unit and the sign unit.

The base includes an upper half case and a bottom half case, wherein a plurality of apertures in sequence is provided on one side of the upper half case for protrusion of the turning parts disposed on one side of the bottom half case. When in practice, it is preferred that the turning part is a polygonal column with a spindle and on one side of the bottom half case is disposed with a plurality of stands having two lateral plates in parallel disposition. A spindle bore is provided on each lateral plate for coupling with the two ends of the spindle of the turning part.

A positioning part is disposed near one side of the stand and on one side of the turning part is provided with a plurality of recesses arranged circularly, and each recess corresponds to the positioning part for positioning the turning part.

When in practice, the turning part also can be a sphere with a plurality of faces and on one side of the bottom half case is provided with a plurality of fossa-shape recesses for receiving the turning part therein.

When in practice, the sign unit can be a character, a pattern, or a color, and the indicator unit and the sign unit are of the same character, pattern, or color.

A plurality of quizzes is randomly arranged on recto of the image card and the question units are vertically arranged on the lateral side of the recto of the image card.

Besides, on verso of the image card has the plurality of the question-description units, two neighboring rows of the question units and correct answer units. The row of the correct answer units is disposed near the turning part for a user to check if the indicator units of the turning part correspond to the correct answer units.

The following detailed description, given by way of examples and not intended to limit the invention solely to the embodiments described herein, will best be understood in conjunction with the accompanying drawings.

DETAILED DESCRIPTION OF THE PREFERRED EMBODIMENTS

Figure 1:
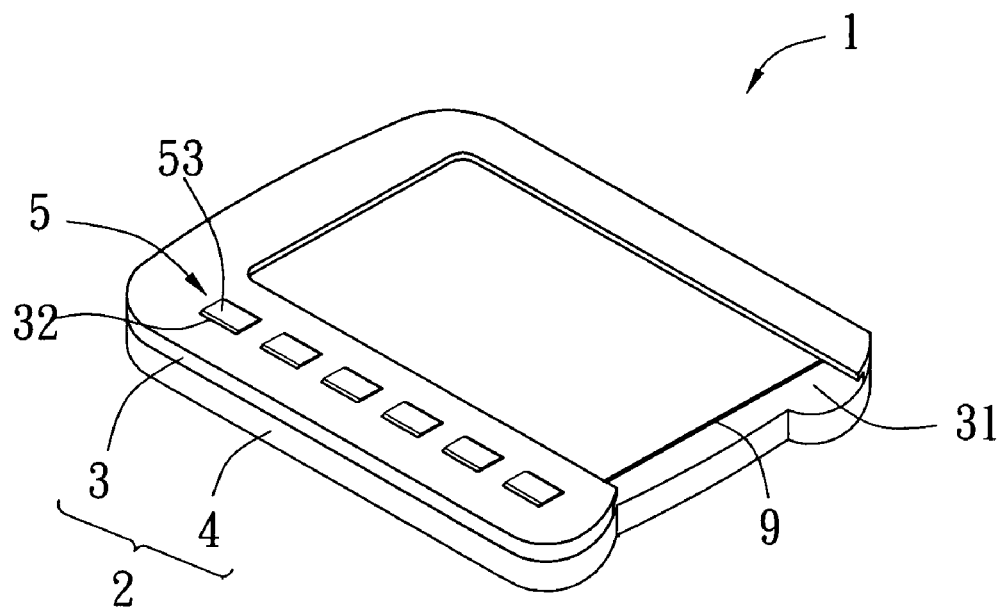
FIG. 1 is a perspective view showing a first embodiment of the present invention.
Figure 2:
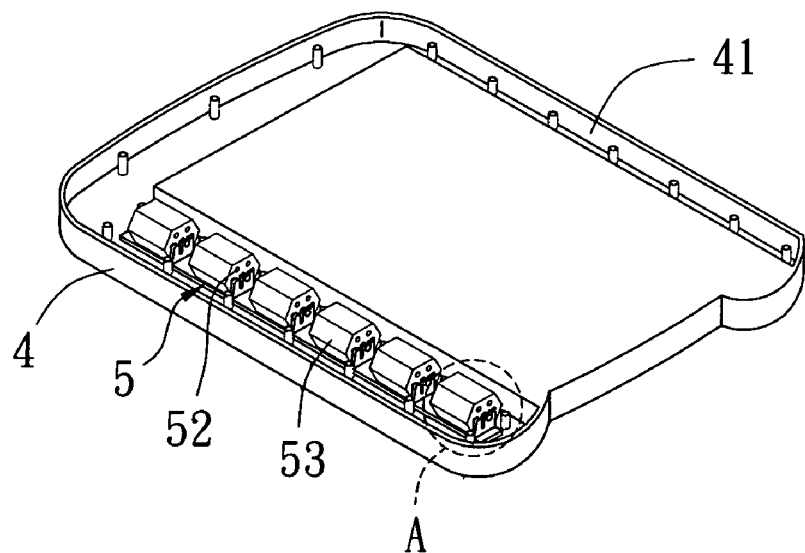
FIG. 2 shows part of the first embodiment of the present invention.
Figure 2A:
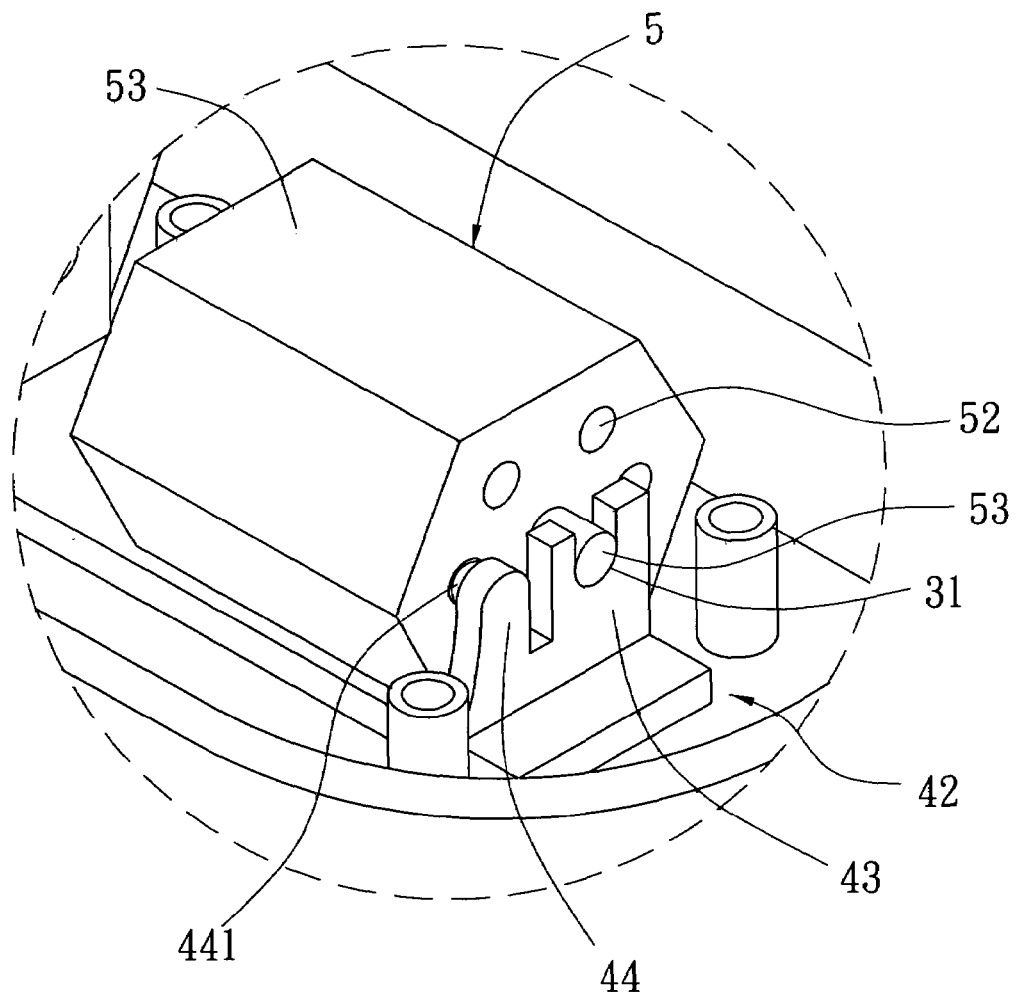
FIG. 2A shows the enlarged A portion in FIG. 2.
Figure 3:
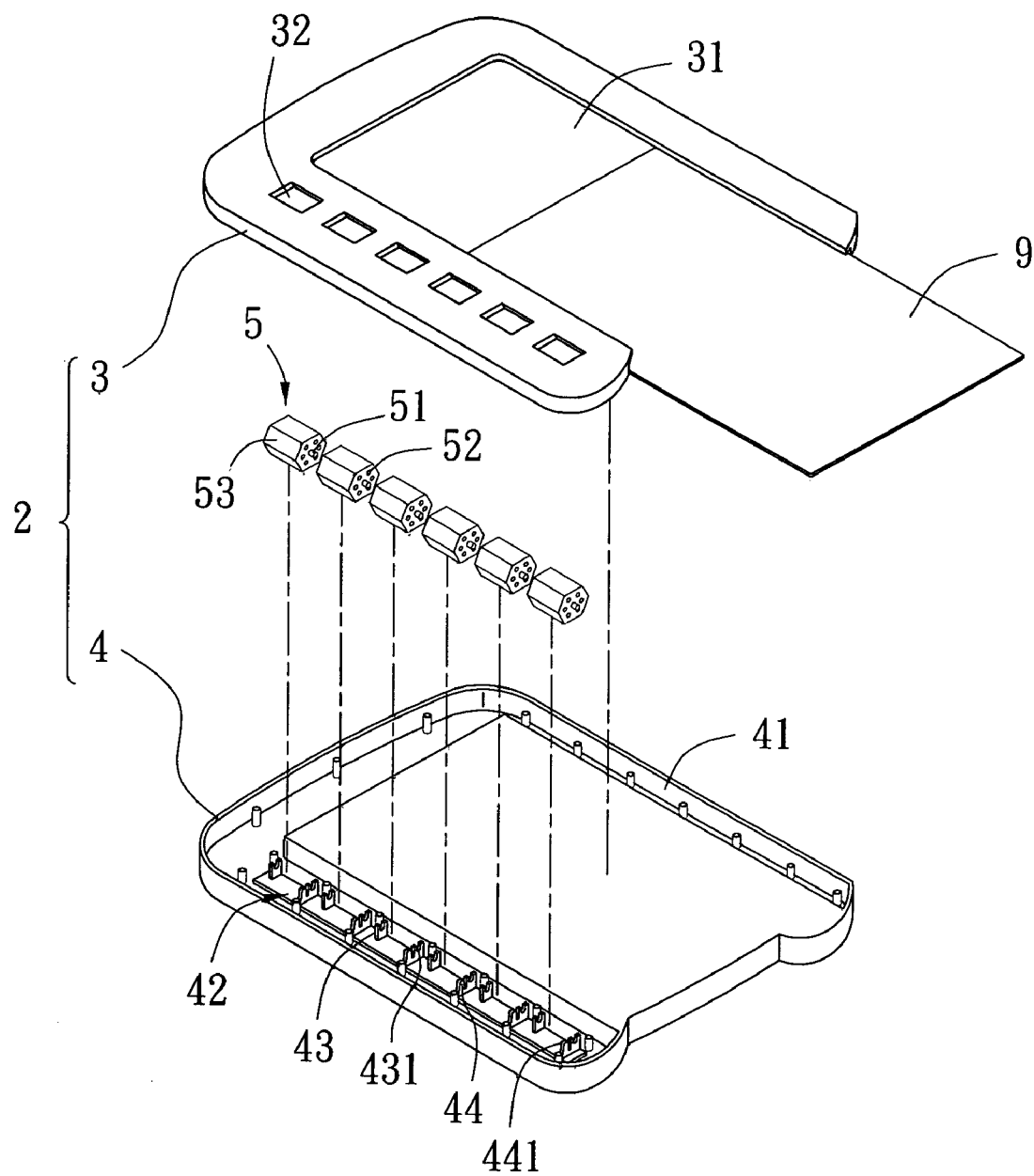
FIG. 3 is an exploded perspective view showing the first embodiment of the present invention.

Referring to FIG. 1~4, these figures show a first embodiment according to the present invention wherein a puzzle device for teaching 1 comprises a base 2 and at least an image card 9.

The base 2 includes a upper half case 3 and a corresponding bottom half case 4, wherein one side of the upper half case 3 has a slot 31 for inserting an image card 9 therein and a window is formed above the slot for a user to visualize the image card 9 after being inserted into the slot 31. A plurality of square apertures 32 is provided on one side of the upper half case 3 for protrusion of a plurality of turning parts 5 disposed on one side of the bottom half case 4. The turning part 5 is polygonal and it is hexagonal in this embodiment. The turning part 5 has a spindle 51 stretching out of the two ends of the turning part 5 and is provided with a plurality of round recesses 52 circularly arranged on one side of the turning part 5. Each of six indicators 53 is disposed on one face of the turning part 5 and the indicators 53 can be characters, patterns, or colors.

In the interior peripheries of the bottom half case 4 has a U-shape groove 41, on one side of which disposes a plurality of stands 42 each of which includes two lateral plates 43 in parallel disposition. Each lateral plate 43 is provided with a spindle bore 431 for coupling with two ends of the spindle 51 of the turning part 5 to make the turning part 5 rotatable. Adjacent to one side of the lateral plate 43 of the stand 42 has an upright plate 44 on which disposes a bulge to be served as a positioning part 441 which performs with the plurality of recesses 52 on one side of the turning part 5 for positioning the turning part 5 whenever it is rotated by a certain angle.

A plurality of quiz units 91 and question units 92 are set on recto of the image card 9, wherein the quiz units 91 include a plurality of question-description units 911 and sign units 912 and are arranged randomly on recto of the image card, the question units 92 are vertically arranged on the lateral side of the recto of the image card 9, and each question unit 92 is set besides one turning part 5.

When in practice, each sign unit 912 of the image card 9 is a circle with different pattern that is the same of the pattern of the indicator unit 52. The sign unit 912 also can be a character and the indicator unit 52 is that character accordingly. If the sign unit 912 is a color, the indicator unit 52 is also that color.

Thereby, a user can find the question-description unit 92 according to the question unit 911 on the image card 9, and then can turn the turning part 5 according to the indication of the sign unit 912 to match the indicator unit 53 and the sign unit 912.

Figure 4:
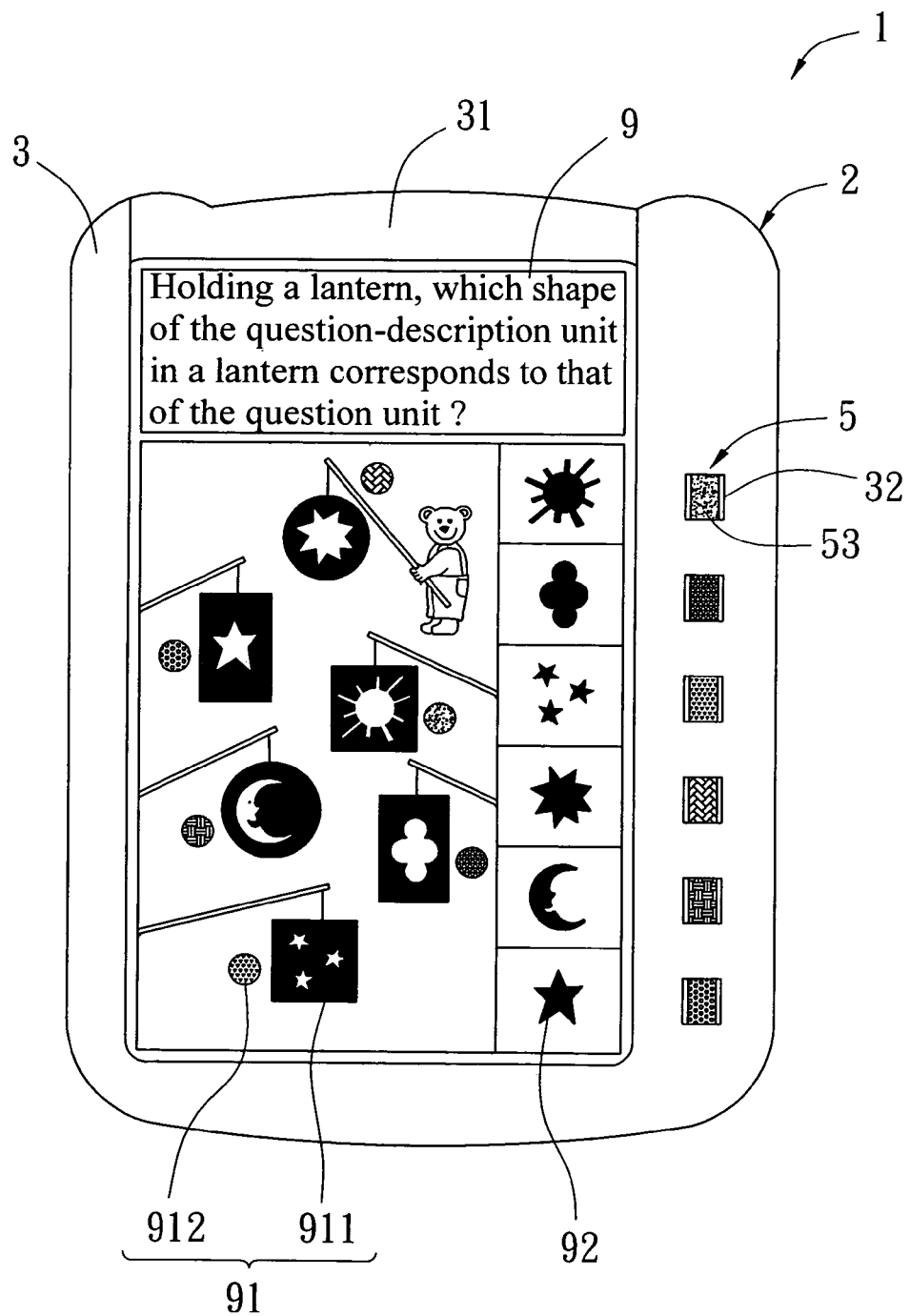
FIG. 4 shows the first embodiment of the present invention in use.
Figure 5:
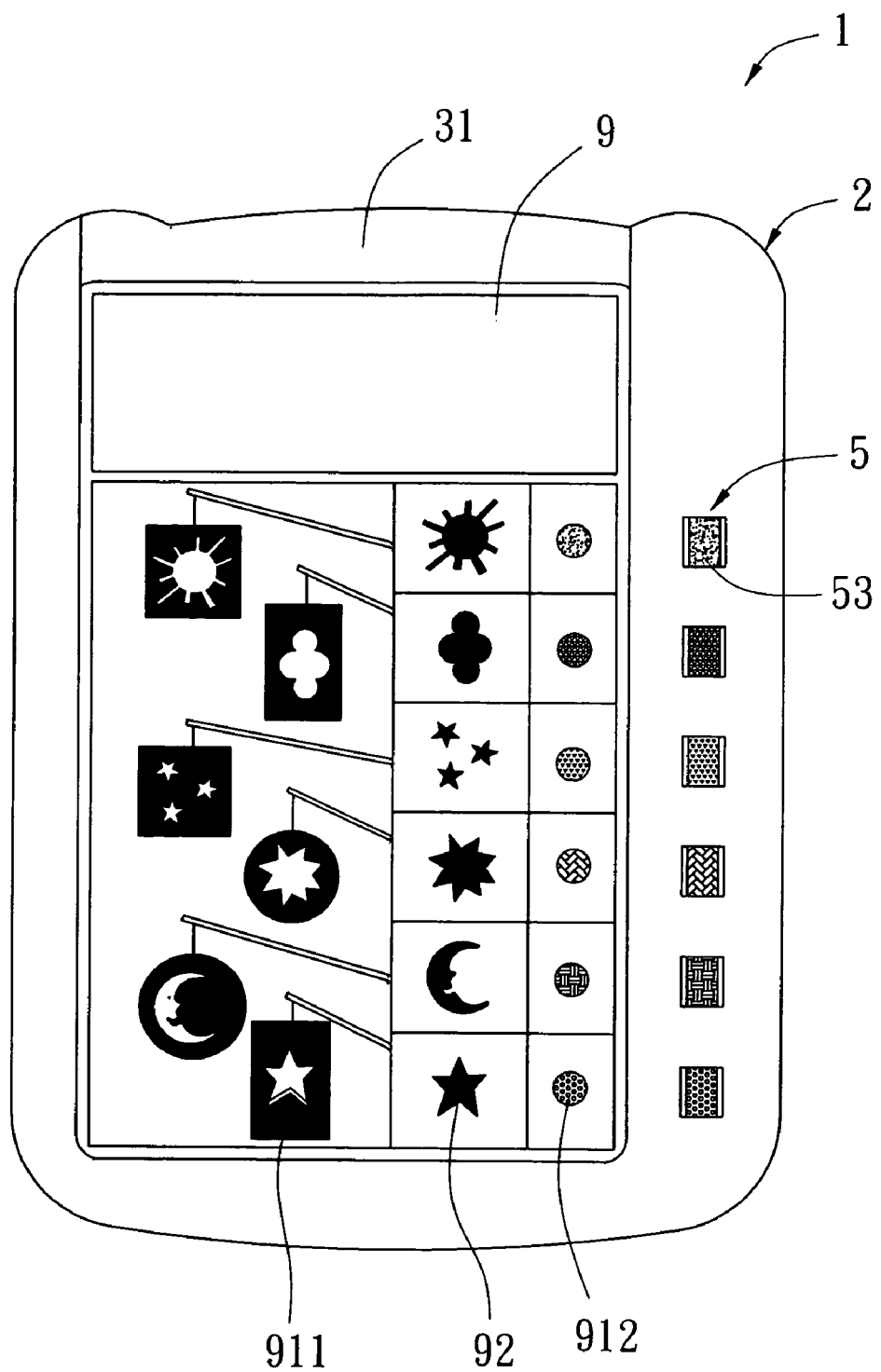
FIG. 5 is a top view showing that an image card is inserted into the base in which its bottom-side faces up according to the present invention.

The present invention will be better understood via an explanation on actual use of an image card. As shown in FIG. 4, the image card 9 is inserted into the slot 31 of the base 2, six groups of quiz units 91 are randomly arranged on recto of the image card and six groups of question units are vertically arranged on lateral side of recto of the image card 9, and six turning parts 5 are set next to the six answer units 92 respectively. The question written on the upside of the image card 9 is "holding a lantern, which shape of the question-description unit 911 in a lantern corresponds to the shape of the question unit 92?" For example, if the shape of the question unit 92 is a star, a user has to find the lantern of the question-description unit 911 in which is a star and the sign unit 912 of the same group of the question-description unit 911. Then the user should turn the turning part 5 to the face on which the indicator unit 53 should have the same pattern of the sign unit 912, in this case, a circle with honeycombed pattern.

After finishing six groups of quiz units, a user can check whether each indicator unit 53 of the turning part 5 corresponds to the sign unit 912 by referring to verso of the image card. Six groups of question-description units 911, two neighboring rows of six question units 92 and six correct answer units are arranged on verso of the image card 9, wherein the six correct answer units are set next to the six turning parts respectively. If the indicator unit 53 of the turning part 5 corresponds to the correct answer unit, the answer is correct. During playing the puzzle device for teaching, a user not only has to think over these quizzes, but also has to answer by using their hands manually.

Figure 6:
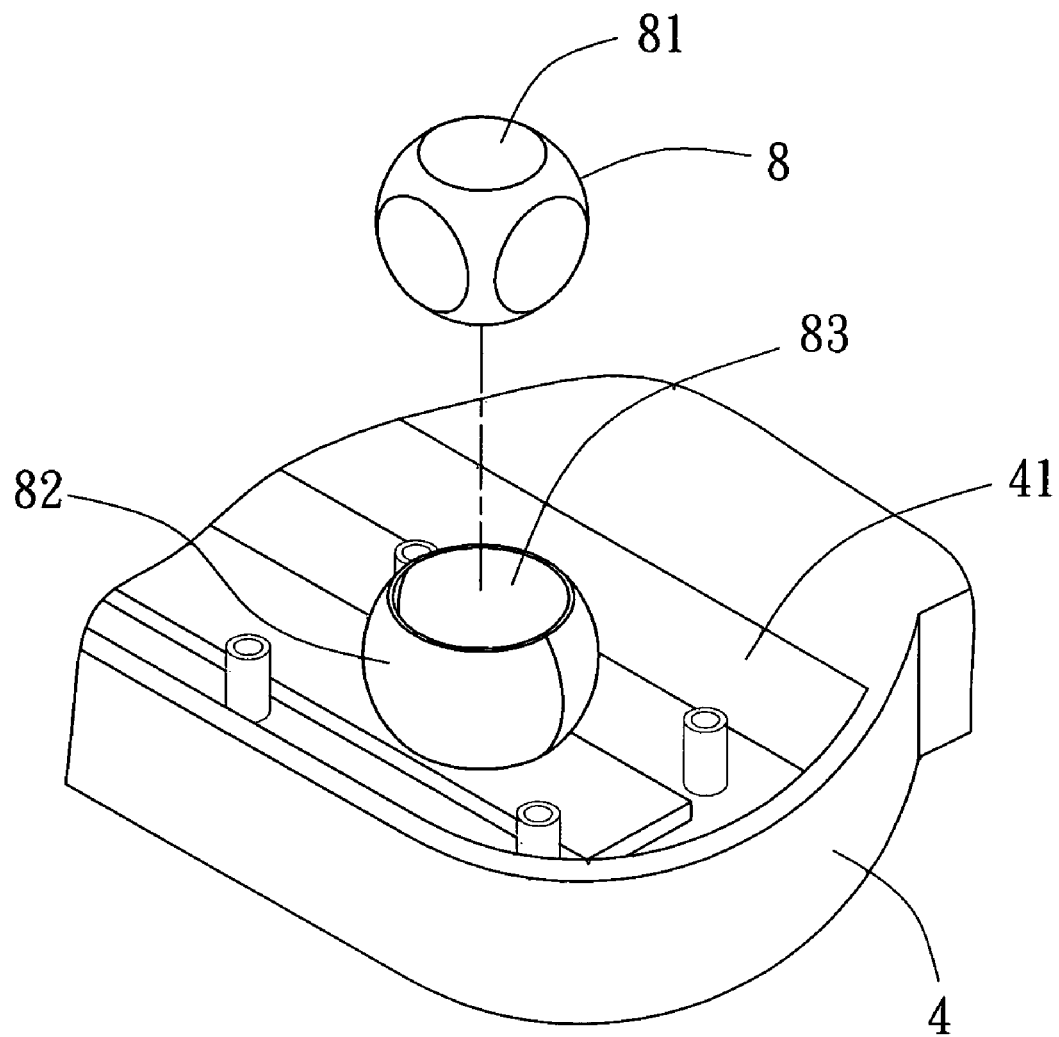
FIG. 6 shows part of a second embodiment of the present invention.

Referring to FIG. 6, it shows a second embodiment of the present invention, wherein a turning part 8 is a sphere 81 with a plurality of faces and on one side of the U-shape groove disposes a plurality of round positioning seats 82 on each of which is provided with a fossa-shape recess 83 for receiving the turning part 8 therein. A user also has to answer by turning the turning part 8 manually.

Thereby, the present invention has following advantages:

1. The present invention can provide image quizzes of different levels of difficulty for children practicing while entertaining and strengthen the learning effect.

2. According to the present invention, children have to answer by using their hands so that the present invention is beneficial both to the logical thinking and adroitness training for children.

Accordingly, as disclosed in the above description and attached drawings, the present invention can provide quizzes of different levels of difficulty for children to answer the quizzes by using their hands after thinking over these quizzes, have their hands-and-brain reaction trained while entertaining. It is new and can be put into industrial use.

It should be understood that different modifications and variations could be made from the teaching disclosed above by the persons familiar in the art, without departing the spirit of the present invention.

What is claimed is:

1. A puzzle device for teaching, comprising: at least one image card, on recto of which has a plurality of quiz units and question units, wherein each quiz unit has a question-description unit and a sign unit of the same group; and a base having a slot on one side for inserting the image card and a plurality of rotatable turning parts, each of which corresponds to one question unit and has a plurality of indicator units thereon; thereby, a user can find the question-description unit according to the question unit on the image card, and then can turn the turning part according to the indication of the sign unit to match the indicator unit and the sign unit, wherein the base further includes an upper half case and a bottom half case, and on one side of the upper half case provides a plurality of apertures arranged in sequence for protrusion of a plurality of the turning parts disposed on one side of the bottom half case, wherein the turning parts are polygonal columns, wherein on one side of the bottom half case disposes a plurality of stands having two lateral plates arranged in parallel, each lateral plate is provided with a spindle bore, and each turning part has a spindle two ends of which are coupled with the spindle bore respectively.

2. The puzzle device for teaching as claimed in claim 1, wherein the turning parts are hexagonal columns.

3. The puzzle device for teaching as claimed in claim 1, wherein a positioning part is disposed adjacent to one side of the stand and on one side of the turning part is provided with a plurality of recesses arranged circularly, each of which corresponds to the positioning part for positioning the turning part.

4. The puzzle device for teaching as claimed in claim 1, wherein the sign units are characters, patterns, or colors.

5. The puzzle device for teaching as claimed in claim 4, wherein the indicator units of the turning parts are characters, patterns, or colors, and the sign units are characters, patterns, or colors accordingly.

6. The puzzle device for teaching as claimed in claim 1, wherein a plurality of groups of quiz units are randomly arranged on recto of the image card and the question units are vertically arranged on the lateral side of recto of the image card.

7. A puzzle device for teaching, comprising:

at least one image card, on recto of which has a plurality of quiz units and question units, wherein each quiz unit has a question-description unit and a sign unit of the same group; and a base having a slot on one side for inserting the image card and a plurality of rotatable turning parts, each of which corresponds to one question unit and has a plurality of indicator units thereon;

thereby, a user can find the question-description unit according to the question unit on the image card, and then can turn the turning part according to the indication of the sign unit to match the indicator unit and the sign unit, wherein a plurality of the question-description units, two neighboring rows of the question units and correct answer units are arranged on verso of the image card, and the row of the correct answer units are disposed near the turning parts for a user to check if the indicator units of the turning parts correspond to the sign units.

* * * * *